US008769635B2

(12) United States Patent
Varadharajan et al.

(10) Patent No.: US 8,769,635 B2
(45) Date of Patent: *Jul. 1, 2014

(54) MANAGING CONNECTIONS IN A DATA STORAGE SYSTEM

(71) Applicant: CommVault Systems, Inc., Oceanport, NJ (US)

(72) Inventors: Prakash Varadharajan, Manalapan, NJ (US); Henry Wallace Dornemann, Eatontown, NJ (US); Parag Gokhale, Marlboro, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/874,358

(22) Filed: Apr. 30, 2013

(65) Prior Publication Data

US 2013/0247154 A1    Sep. 19, 2013

Related U.S. Application Data

(63) Continuation of application No. 12/643,653, filed on Dec. 21, 2009, now Pat. No. 8,434,131.

(60) Provisional application No. 61/162,140, filed on Mar. 20, 2009.

(51) Int. Cl.
*H04L 29/06* (2006.01)

(52) U.S. Cl.
USPC .......... 726/4; 726/7; 726/17; 726/28; 726/29; 726/30; 709/202; 711/162; 711/163; 713/189; 713/193

(58) Field of Classification Search
USPC ................ 726/2–7, 17, 26–31; 713/189, 193; 711/162, 163; 709/3, 9, 202, 204, 205
See application file for complete search history.

(56) References Cited

U.S. PATENT DOCUMENTS 4,296,465 A    10/1981   Lemak
4,686,620 A     8/1987   Ng
(Continued)

FOREIGN PATENT DOCUMENTS

EP    0259912 A1    3/1988
EP    0405926 A2    1/1991
(Continued)

OTHER PUBLICATIONS

Armstead et al., "Implementation of a Campus-wide Distributed Mass Storage Service: The Dream vs. Reality," *IEEE*, 1995, pp. 190-199.

(Continued)

*Primary Examiner* — Hadi Armouche
*Assistant Examiner* — Hee Song
(74) *Attorney, Agent, or Firm* — Perkins Coie LLP

(57) ABSTRACT

Described in detail herein are systems and methods for managing connections in a data storage system. For example, the systems and methods may be used to manage connections between two or more computing devices for purposes of performing storage operations on the data of one of the computing devices. The data storage system includes at least two computing devices. A first computing device includes an unauthorized connection data structure and a connection manager component. The connection manager component receives a connection request from a second computing device. If the second computing device is not identified on the unauthorized connection data structure, the connection manager component can request that an authentication manager authenticate the second computing device and/or determine whether the second computing device is properly authorized. If so, the connection manager component can allow the second computing device to connect to the first computing device.

20 Claims, 7 Drawing Sheets

(56) References Cited

U.S. PATENT DOCUMENTS

| | | | |
|---|---|---|---|
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,351 A | 4/1994 | Jippo |
| 5,311,509 A | 5/1994 | Heddes et al. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,598,546 A | 1/1997 | Blomgren |
| 5,619,644 A | 4/1997 | Crockett et al. |
| 5,638,509 A | 6/1997 | Dunphy et al. |
| 5,673,381 A | 9/1997 | Huai et al. |
| 5,683,513 A | 11/1997 | Fujimaki |
| 5,699,361 A | 12/1997 | Ding et al. |
| 5,729,743 A | 3/1998 | Squibb |
| 5,751,997 A | 5/1998 | Kullick et al. |
| 5,752,041 A | 5/1998 | Fosdick |
| 5,758,068 A | 5/1998 | Brandt et al. |
| 5,758,359 A | 5/1998 | Saxon |
| 5,761,677 A | 6/1998 | Senator et al. |
| 5,761,734 A | 6/1998 | Pfeffer et al. |
| 5,764,972 A | 6/1998 | Crouse et al. |
| 5,778,395 A | 7/1998 | Whiting et al. |
| 5,805,920 A | 9/1998 | Sprenkle et al. |
| 5,812,398 A | 9/1998 | Nielsen |
| 5,813,009 A | 9/1998 | Johnson et al. |
| 5,813,017 A | 9/1998 | Morris |
| 5,860,104 A | 1/1999 | Witt et al. |
| 5,875,478 A | 2/1999 | Blumenau |
| 5,887,134 A | 3/1999 | Ebrahim |
| 5,901,327 A | 5/1999 | Ofek |
| 5,903,646 A | 5/1999 | Rackman |
| 5,924,102 A | 7/1999 | Perks |
| 5,950,205 A | 9/1999 | Aviani, Jr. |
| 5,956,519 A | 9/1999 | Wise et al. |
| 5,970,233 A | 10/1999 | Liu et al. |
| 5,970,255 A | 10/1999 | Tran et al. |
| 5,974,563 A | 10/1999 | Beeler, Jr. |
| 5,999,629 A | 12/1999 | Heer et al. |
| 6,003,089 A | 12/1999 | Shaffer et al. |
| 6,009,274 A | 12/1999 | Fletcher et al. |
| 6,012,090 A | 1/2000 | Chung et al. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem |
| 6,094,416 A | 7/2000 | Ying |
| 6,094,684 A | 7/2000 | Pallmann |
| 6,105,129 A | 8/2000 | Meier et al. |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,169,976 B1 | 1/2001 | Colosso |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,292,783 B1 | 9/2001 | Rohler et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,381,331 B1 | 4/2002 | Kato |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,564,228 B1 | 5/2003 | O'Connor |
| 6,577,734 B1 | 6/2003 | Etzel et al. |
| 6,604,149 B1 | 8/2003 | Deo et al. |
| 6,654,825 B2 | 11/2003 | Clapp et al. |
| 6,658,526 B2 | 12/2003 | Nguyen et al. |
| 6,757,680 B1 | 6/2004 | Choy |
| 6,772,332 B1 | 8/2004 | Boebert et al. |
| 6,898,286 B2 | 5/2005 | Murray |
| 6,973,621 B2 | 12/2005 | Sie et al. |
| 7,035,880 B1 | 4/2006 | Crescenti et al. |
| 7,130,970 B2 | 10/2006 | Devassy et al. |
| 7,209,972 B1 | 4/2007 | Ignatius et al. |
| 7,213,269 B2 | 5/2007 | Orthlieb et al. |
| 7,277,941 B2 | 10/2007 | Ignatius et al. |
| 7,287,045 B2 | 10/2007 | Saika et al. |
| 7,287,047 B2 | 10/2007 | Kavuri |
| 7,315,923 B2 | 1/2008 | Retnamma et al. |
| 7,320,068 B2 | 1/2008 | Zimniewicz et al. |
| 7,328,189 B2 | 2/2008 | Ling |
| 7,360,252 B1 | 4/2008 | Torrubia-Saez et al. |
| 7,389,273 B2 | 6/2008 | Irwin et al. |
| 7,395,282 B1 | 7/2008 | Crescenti et al. |
| 7,401,154 B2 | 7/2008 | Ignatius et al. |
| 7,506,102 B2 | 3/2009 | Lev-Ran et al. |
| 7,519,827 B2 | 4/2009 | Anderson et al. |
| 7,581,077 B2 | 8/2009 | Ignatius et al. |
| 7,620,976 B2 | 11/2009 | Low et al. |
| 7,627,569 B2 | 12/2009 | Gafter |
| 7,627,776 B2 | 12/2009 | Petruzzo |
| 7,702,693 B1 | 4/2010 | Aiyagari et al. |
| 7,739,381 B2 | 6/2010 | Ignatius et al. |
| 7,748,027 B2 | 6/2010 | Patrick |
| 7,761,713 B2 | 7/2010 | Baar |
| 7,782,742 B2 | 8/2010 | Park |
| 7,805,600 B2 | 9/2010 | Bucher et al. |
| 7,818,262 B2 | 10/2010 | Kavuri et al. |
| 7,840,537 B2 | 11/2010 | Gokhale et al. |
| 7,882,315 B2 | 2/2011 | Tsai et al. |
| 7,926,087 B1 | 4/2011 | Holl, II et al. |
| 8,108,427 B2 | 1/2012 | Prahlad et al. |
| 8,131,648 B2 | 3/2012 | Barton |
| 8,140,786 B2 | 3/2012 | Bunte et al. |
| 8,165,221 B2 | 4/2012 | Zheng et al. |
| 8,200,191 B1 | 6/2012 | Belser et al. |
| 8,219,524 B2 | 7/2012 | Gokhale |
| 2002/0007347 A1 | 1/2002 | Blumenthal et al. |
| 2002/0007351 A1 | 1/2002 | Hillegass et al. |
| 2002/0077988 A1 | 6/2002 | Sasaki et al. |
| 2002/0120726 A1 | 8/2002 | Padole et al. |
| 2002/0128976 A1 | 9/2002 | O'Connor et al. |
| 2002/0147734 A1 | 10/2002 | Shoup et al. |
| 2002/0174011 A1 | 11/2002 | Sanchez et al. |
| 2003/0005428 A1 | 1/2003 | Roman |
| 2003/0131252 A1 | 7/2003 | Barton |
| 2003/0200104 A1 | 10/2003 | Heming et al. |
| 2004/0093229 A1 | 5/2004 | Plain |
| 2004/0204949 A1 | 10/2004 | Shaji et al. |
| 2004/0210509 A1 | 10/2004 | Eder |

(56) References Cited

U.S. PATENT DOCUMENTS

| | | | |
|---|---|---|---|
| 2004/0249759 A1 | 12/2004 | Higashi et al. |
| 2004/0255143 A1 | 12/2004 | Wemyss et al. |
| 2005/0004951 A1 | 1/2005 | Ciaramitaro et al. |
| 2005/0027657 A1 | 2/2005 | Leontiev et al. |
| 2005/0091655 A1 | 4/2005 | Probert et al. |
| 2005/0097440 A1 | 5/2005 | Lusk et al. |
| 2005/0108526 A1 | 5/2005 | Robertson |
| 2006/0224846 A1 | 10/2006 | Amarendran et al. |
| 2006/0242296 A1 | 10/2006 | Woolard et al. |
| 2006/0242558 A1 | 10/2006 | Racovolis et al. |
| 2007/0050362 A1 | 3/2007 | Low et al. |
| 2007/0198421 A1 | 8/2007 | Muller et al. |
| 2007/0198422 A1 | 8/2007 | Prahlad et al. |
| 2008/0005380 A1 | 1/2008 | Kawasaki et al. |
| 2008/0091747 A1 | 4/2008 | Prahlad et al. |
| 2008/0229037 A1 | 9/2008 | Bunte et al. |
| 2008/0243795 A1 | 10/2008 | Prahlad et al. |
| 2008/0243879 A1 | 10/2008 | Gokhale et al. |
| 2008/0307020 A1 | 12/2008 | Ko et al. |
| 2008/0320319 A1 | 12/2008 | Muller et al. |
| 2009/0222907 A1 | 9/2009 | Guichard |
| 2009/0319534 A1 | 12/2009 | Gokhale |
| 2009/0319585 A1 | 12/2009 | Gokhale |
| 2010/0031017 A1 | 2/2010 | Gokhale et al. |
| 2010/0242096 A1 | 9/2010 | Varadharajan et al. |
| 2010/0313039 A1 | 12/2010 | Ignatius et al. |
| 2012/0023140 A1 | 1/2012 | Prahlad et al. |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0862304 A2 | 9/1998 |
| EP | 0899662 A1 | 3/1999 |
| EP | 0981090 A1 | 2/2000 |
| WO | WO-9513580 A1 | 5/1995 |
| WO | WO-9912098 A1 | 3/1999 |

OTHER PUBLICATIONS

Arneson, "Mass Storage Archiving in Network Environments," Digest of Papers, Ninth IEEE Symposium on Mass Storage Systems, Oct. 31-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5-9, 1995, pp. 420-427, San Francisco, CA.

CommVault Systems, Inc., "QiNetix Books Online Documentation," submitted on CD-ROM, released Dec. 2005.

CommVault, "Firewall Considerations—How To," <http://documentation.commvault.com/commvault/release_8_0_0/books_online_1/english_us/features/firewall/firewall_how_to.htm>, internet accessed on Feb. 27, 2009, 11 pages.

CommVault, "Firewall Considerations," <http://documentation.commvault.com/commvault/release_8_0_0/books_online_1/english_us/features/firewall/firewall.htm>, internet accessed on Feb. 27, 2009, 8 pages.

Eitel, "Backup and Storage Management in Distributed Heterogeneous Environments," IEEE, 1994, pp. 124-126.

Jander, M., "Launching Storage-Area Net," *Data Communications*, US, McGraw Hill, NY, vol. 27, No. 4 (Mar. 21, 1998), pp. 64-72.

Gait, J. "The Optical File Cabinet: A Random-Access File System for Write-Once Optical Disks," *IEEE Computer*, vol. 21, No. 6, pp. 11-22 (1988) (see in particular figure 5 in p. 15 and recitation in claim 5).

Kwok, S. H., Digital rights management for the online music business, SIGecom Exch. 3, 3 (Jun. 2002), available at <http://doi.acm.org/10.1145/844339.844347>, 8 pages.

Microsoft SQL Server Documentation, "Adding a Member to a Predefined Role," 1988-2000, accessed Apr. 18, 2008, 3 pages.

Microsoft SQL Server Documentation, "Adding a Member to a SQL Server Database Role," 1988-2000, accessed Apr. 18, 2008, 2 pages.

Microsoft SQL Server Documentation, "Adding a Windows User or Group," 1988-2000, accessed Apr. 18, 2008, 2 pages.

Microsoft SQL Server Documentation, "Authentication Modes," 1988-2000, accessed Apr. 18, 2008, 4 pages.

Microsoft SQL Server Documentation, "Creating User-Defined SQL Server Database Roles," 1988-2000, accessed Apr. 18, 2008, 2 pages.

Microsoft SQL Server Documentation, "Granting a Windows User or Group Access to a Database," 1988-2000, accessed Apr. 18, 2008, 2 pages.

Microsoft SQL Server Documentation, "Security Architecture," 1988-2000, accessed Apr. 18, 2008, 1 page.

Ron White, "How Computers Work", Sixth Edition, Que Corporation, Jun. 26, 2002, 7 pages.

Rosenblum et al., "The Design and Implementation of a Log-Structured File System," *Operating Systems Review SIGOPS*, vol. 25, No. 5, New York, US, pp. 1-15 (May 1991).

U.S. Appl. No. 13/868,320, filed Apr. 23, 2013, Ignatius et al.

U.S. Appl. No. 13/899,384, filed May 21, 2013, Prahlad et al.

MANAGING CONNECTIONS IN A DATA STORAGE SYSTEM

CROSS-REFERENCE TO RELATED APPLICATION

This application is a continuation of U.S. patent application Ser. No. 12/643,653 filed Dec. 21, 2009, now U.S. Pat. No. 8,434,131 (entitled MANAGING CONNECTIONS IN A DATA STORAGE SYSTEM), which claims priority to U.S. patent application Ser. No. 61/162,140 filed Mar. 20, 2009 (entitled MANAGING CONNECTIONS IN A DATA STORAGE SYSTEM), the entirety of each of which is incorporated by reference herein.

BACKGROUND

A data storage system implemented by an organization may include numerous entities (e.g., computing devices such as personal computers, server computers, mobile devices, etc, as well as storage devices such as magnetic storage devices, tape libraries, etc.). For example, the data storage system may include a set of first entities storing data that the organization wishes to protect (e.g., a set of computing devices external to the organization) and a second entity that performs data storage operations upon the data (e.g., a local computing device that copies the data of external computing devices to a storage device). The data storage system may also include a third entity that manages the data storage operations (e.g., a managing computing device that authenticates the external computing devices, determines if they are authorized to access the local computing device, and schedules copy operations).

In such a data storage system or in other data storage systems, the organization may wish, for various reasons, to exclude certain entities from performing data storage operations or from having data storage operations performed on their data. For example, the organization may no longer wish to protect the data of certain of the first entities, such as those of an external organization. One way the organization may implement this is by removing the authorization of these external computing devices to access resources in the data storage system and their ability to access such resources. However, if the organization is unable to perform either of these steps for one reason or another (e.g., the organization does not have effective control over them), the external computing devices in this example may not be effectively excluded from requesting the use of resources in the data storage system. Therefore, these external computing devices may continue to request that the organization's local computing device perform data storage operations upon their data. This may result in the local computing device being unable to perform data storage operations upon the data of external computing devices that are still authorized in the data storage system. Therefore, the inability to effectively exclude such external computing devices in this example from requesting the use of resources in the data storage system may result in a denial of data storage operation services to authorized entities.

An entity in a data storage system that has multiple Network Interface Controllers (NICs) may be required, for one or more reasons, to receive and/or respond to connection requests on all of the NICs. For example, an entity that is in a clustered configuration (e.g., a Microsoft Windows clustered configuration), and that performs data storage operations upon the data of other entities, may be required (e.g., by the Microsoft Windows clustering software) to receive connection requests on the NIC of each node in the cluster. However, it may be desirable to configure the entity to receive and/or respond to connection requests on a subset of all of its NICs. As another example, it may be desirable to configure an entity that has multiple NICs, each attached to a different network (e.g., one NIC attached to a private network such as a Local Area Network (LAN) or a Wide Area Network (WAN) and one NIC attached to a public network such as the Internet), to only receive and/or respond to connection requests received at one NIC (e.g., to only receive and/or respond to connection requests received at the NIC attached to the private network).

The need exists for systems and methods that overcome the above problems, as well as systems and methods that provide additional benefits. Overall, the examples herein of some prior or related systems and methods and their associated limitations are intended to be illustrative and not exclusive. Other limitations of existing or prior systems and methods will become apparent to those of skill in the art upon reading the following Detailed Description.

DETAILED DESCRIPTION

Figure 1:
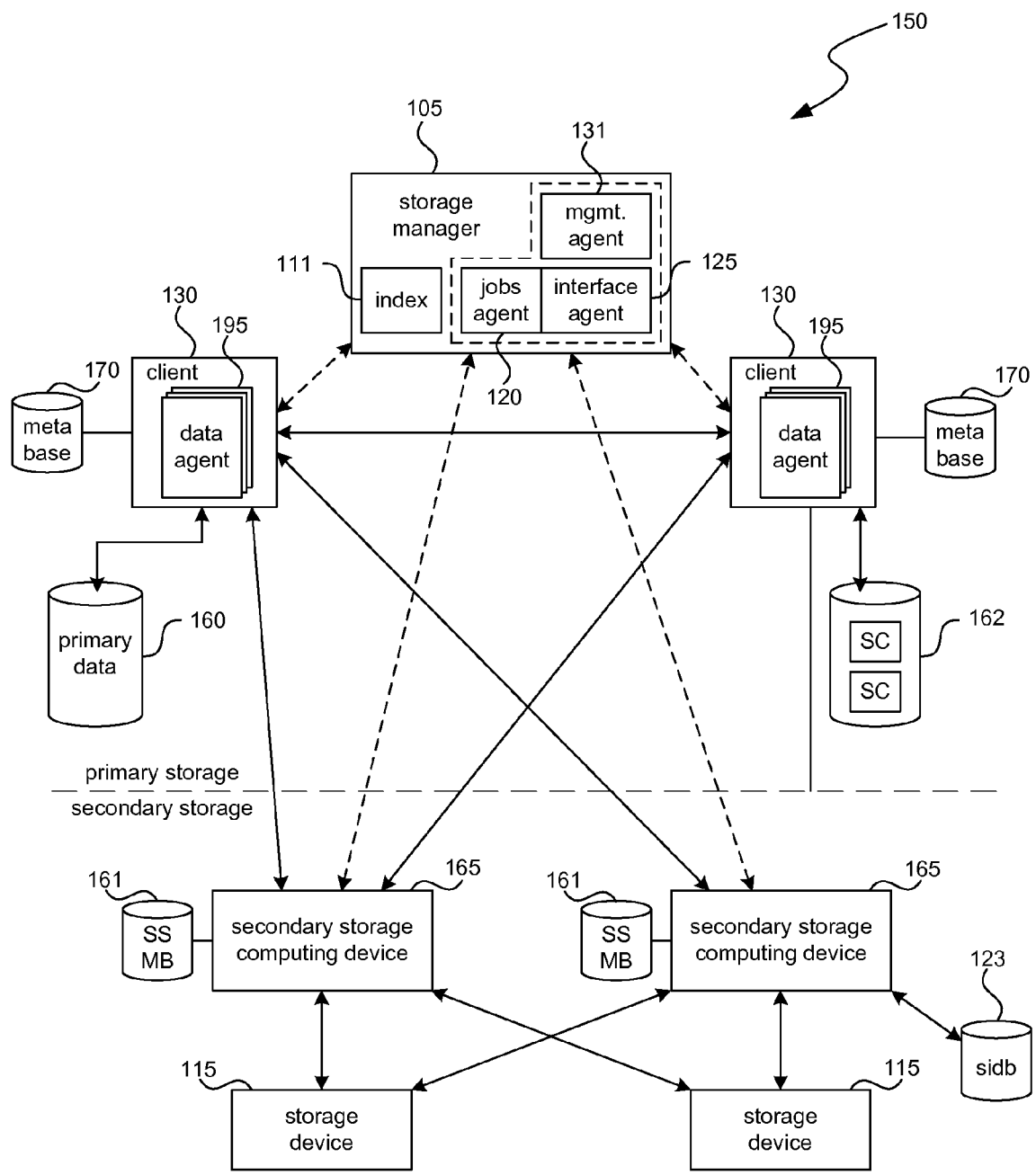
FIG. 1 is a block diagram illustrating an example of a data storage system that may employ aspects of the invention.

The headings provided herein are for convenience only and do not necessarily affect the scope or meaning of the claimed invention.

Overview

Described in detail herein are systems and methods for managing connections in a data storage system (alternatively called a data storage network, a data storage environment, or a data storage enterprise). For example, the systems and methods may be used to manage connections for purposes of performing data storage operations in the data storage system. Data storage operations include, for example and without limitation, backup operations, restore operations, archival operations, copy operations, Continuous Data Replication (CDR) operations, recovery operations, migration operations, and Hierarchical Storage Management (HSM) operations. In some examples, a system for managing connections in a data storage system includes at least two computing devices. A first computing device includes an unauthorized connection data structure (e.g., a blacklist of unauthorized computing devices) and a connection manager component that uses the unauthorized connection data structure to manage connection requests from other computing devices.

The unauthorized connection data structure includes one or more entries (although it may begin with zero entries). The entries are configured to store information including an identifier of a computing device and, optionally, a timestamp indicating a time at which the first computing device received a connection request from the identified computing device. Entries in the unauthorized connection data structure may be permanent or semi-permanent entries, which include information identifying computing devices to which connection requests should generally always be refused. Or, entries may be dynamic entries, which include information identifying computing devices to which connection requests have been refused based upon the occurrence of an event or the satisfaction of a rule (e.g., an unsuccessful authentication and/or authorization attempt).

For example, the unauthorized connection data structure may include Internet Protocol (IP) addresses of several computers that are permanently or semi-permanently not authorized to perform data storage operations. These IP addresses correspond to permanent or semi-permanent entries. The connection manager component will generally always refuse connection requests from such computers. The unauthorized connection data structure may also include IP addresses of several computers that may also no longer be authorized to perform data storage operations, but their IP address are not permanently or semi-permanently added to the unauthorized connection data structure. These IP addresses have corresponding timestamps from which the period of time for which the identified computers are prohibited from connecting can be inferred. These entries correspond to dynamic entries in the unauthorized connection data structure.

When the first computing device's connection manager component receives a connection request from a second computing device, it determines an identifier identifying the second computing device (e.g., an IP address) from the connection request. The connection manager component uses either the identifier or the combination of the identifier and the time at which the connection request is received to determine from the unauthorized connection data structure whether the connection request from the second computing device should be refused. If so, the connection manager component refuses the connection request. If not, the connection manager component attempts to authenticate the second computing device and determine whether the second computing device is authorized to access resources of the first computing device.

For example, if the second computing device's IP address is not on the unauthorized connection data structure, the connection manager component can request that a third computing device (e.g., an authentication computing device) authenticate the second computing device. The connection manager component can determine whether the second computing device is properly authorized, or the third computing device can perform the authorization process.

If the second computing device is authenticated and properly authorized, then the connection manager component allows the second computing device to connect to the first computing device. If not, the connection manager component refuses the connection request. In some cases, the connection manager component either adds an entry to the unauthorized connection data structure that includes the identifier of the first computing device and a timestamp indicating the connection request time, or modifies a timestamp of an existing entry that already includes the identifier of the first computing device to indicate the connection request time.

For example, if the second computing device does not have an entry in the unauthorized connection data structure identifying it (this may indicate that the second computing device has not tried to connect to the first computing device within a certain time period), the connection manager component will add an entry to the unauthorized connection data structure. If the second computing device already has an entry in the unauthorized connection data structure (this typically indicates that the second computing device has previously tried to connect to the first computing device within the certain time period), the connection manager component will update the existing entry to update the time of the latest connection request. Therefore, a second unsuccessful connection request within the certain time period extends the period of time for which the second computing device is prohibited from connecting to the first computing device.

As an example of how these systems and methods can be implemented, consider an organization that contracts with a vendor to perform data storage operations on the contracting organization's computers (e.g., in a Software as a Service (SaS) context). In some situations, it would be advantageous for the vendor to refuse, with minimal effort, data storage operation requests by the contracting organization's computers. For example, if the contracting organization is no longer paying for the vendor's services, the vendor typically would like to refuse data storage operation requests by its computers. The vendor would ideally like to refuse such requests with minimal use of the vendor's resources. The vendor can do so in one or both of two ways. First, the vendor can add identifiers of the prohibited computers to the unauthorized connection data structure used by the first computing device (permanent or semi-permanent entries). When the prohibited computers request connections to the computing device, the first computing device will consult the unauthorized connection data structure, determine that they are identified on it and thus prohibited, and thus refuse the connection requests.

Second, the vendor can remove the accounts of the prohibited computers from the authentication manager computer that manages data storage operations and/or remove the authorization of the prohibited computers to perform data storage operations in the data storage system. This will result in the prohibited computers not being authenticated and/or properly authorized when they request connections to the first computing device. When they do request connections, the first computing device can then add their identifiers to the unauthorized connection data structure along with a timestamp indicating the connection request time (dynamic entries). Any connection requests from the prohibited computers during a certain period of time from the connection request time would then be automatically refused.

Accordingly, the first computing device's act of identifying prohibited computing devices can be thought of as short-cutting the authentication and authorization processes that normally would have to occur whenever a computing device attempts to connect to the first computing device. These processes may consume resources of the first computing device and/or the authentication manager computing device that could be directed elsewhere, such as to performing data storage operations upon the data of authorized computing devices. Accordingly, the systems and methods described herein can provide significant benefits.

Reference to this particular example is made throughout this application. Those of skill in the art will understand, however, that aspects of the invention are not limited to this particular example, and that other situations are entirely possible. For example, the prohibited computing devices may have been licensed at one time to engage in data storage operations but are no longer licensed (e.g., a trial period of software installed on the prohibited computing devices has expired). As another example, the prohibited computing devices may be using a version of software that is no longer supported or maintained. As another example, the vendor may wish to limit the time periods during which the computing devices can request data storage operations (e.g., from 2 am to 4 am) or the scope of the data storage operations requested by the computing devices (e.g., only upon certain data, or only for certain data storage operations).

In some examples, the first computing device also includes an interface blacklist data structure. The interface blacklist data structure includes zero or more entries. The entries are configured to store information including an identifier of an interface at which connection requests are received. The first computing device receives connection requests at one or more interfaces (e.g., NICs). The connection manager component determines one or more identifiers of the one or more interfaces at which a connection request from a second computing device is received. The connection manager component uses the one or more identifiers to determine from the interface blacklist data structure whether the connection request from the second computing device should be refused at the one or more interfaces. If so, the connection manager component refuses the connection request.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

FIGS. 1, 2A-2C, and the discussion herein provide a brief, general description of a suitable specialized environment in which the invention can be implemented. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. The terms "computer," "server," "host," "host system," and the like are generally used interchangeably herein, and refer to any of the above devices and systems, as well as any data processor.

While aspects of the invention, such as certain functions, are described as being performed exclusively on a single device, the invention can also be practiced in distributed environments where functions or modules are shared among disparate processing devices, which are linked through a communications network, such as a Local LAN, WAN, or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Aspects of the invention will now be described in detail with respect to FIGS. 1 through 5. FIG. 1 is a block diagram illustrating an example of a data storage system that may employ aspects of the invention. Entities in the data storage system may be arranged in various configurations, with certain entities on a friendly side of a firewall and others on a hostile side of the firewall or on a friendly side of a second firewall (see FIGS. 2A-2C for example configurations). An entity configured in accordance with aspects of the invention may include various components (see FIG. 3A, illustrating some components) that perform the various functions described herein.

Figures 3A, 3B:
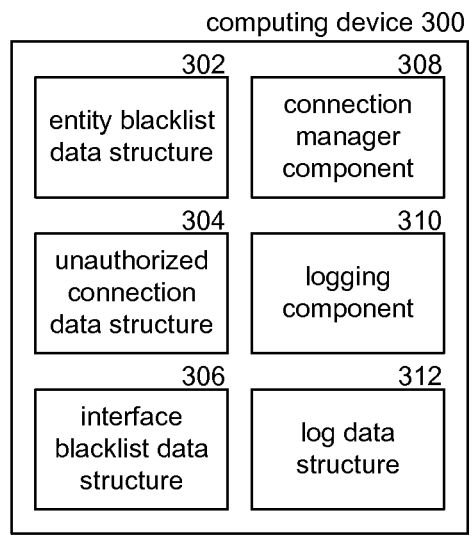
FIG. 3A is a block diagram illustrating a computing device configured in accordance with aspects of the invention.
FIG. 3B is a diagram illustrating a suitable data structure that may be utilized by aspects of the invention.
Figure 4:
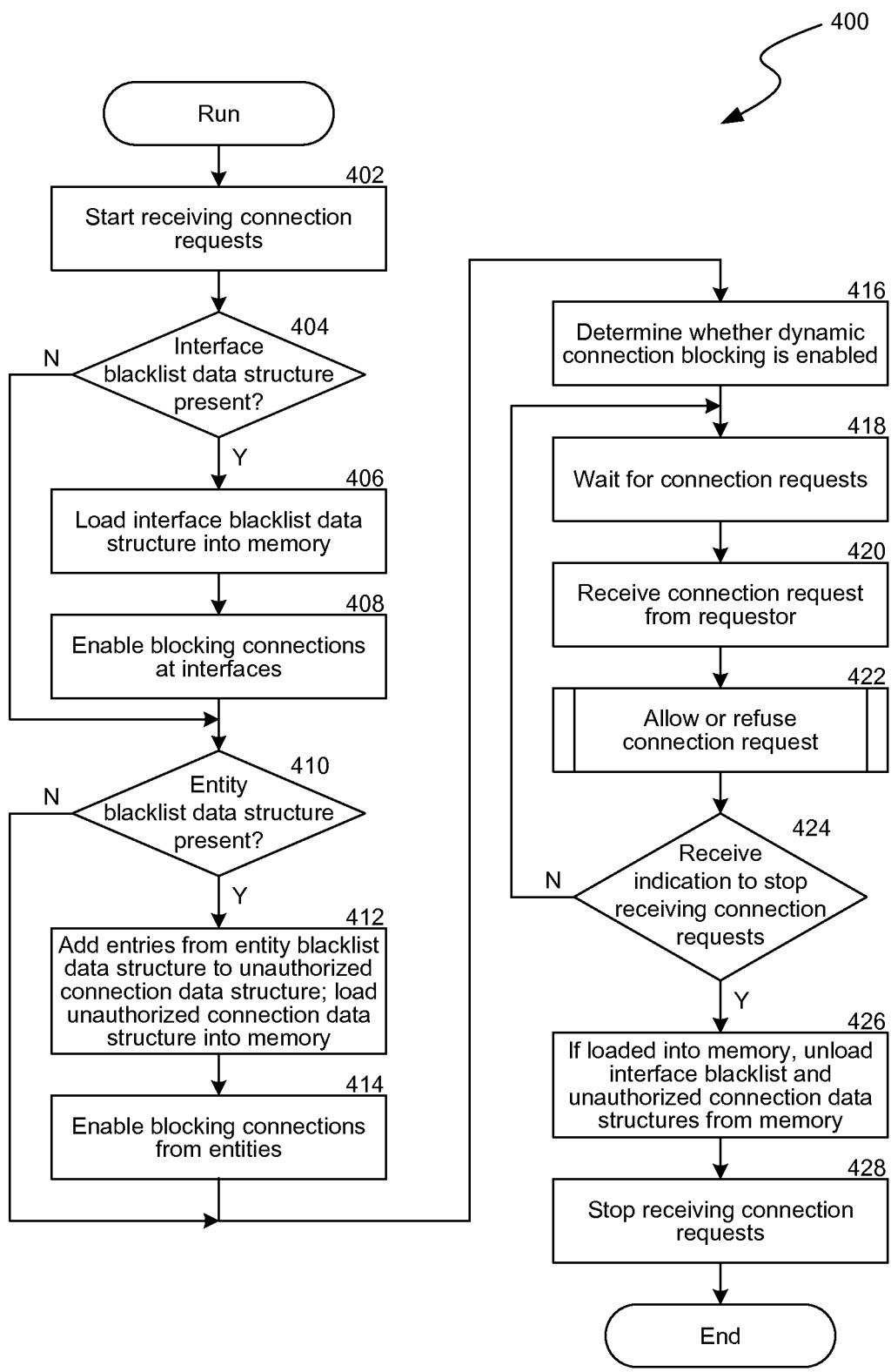
FIG. 4 is a flow diagram of a process for receiving connection requests.
Figure 5A:
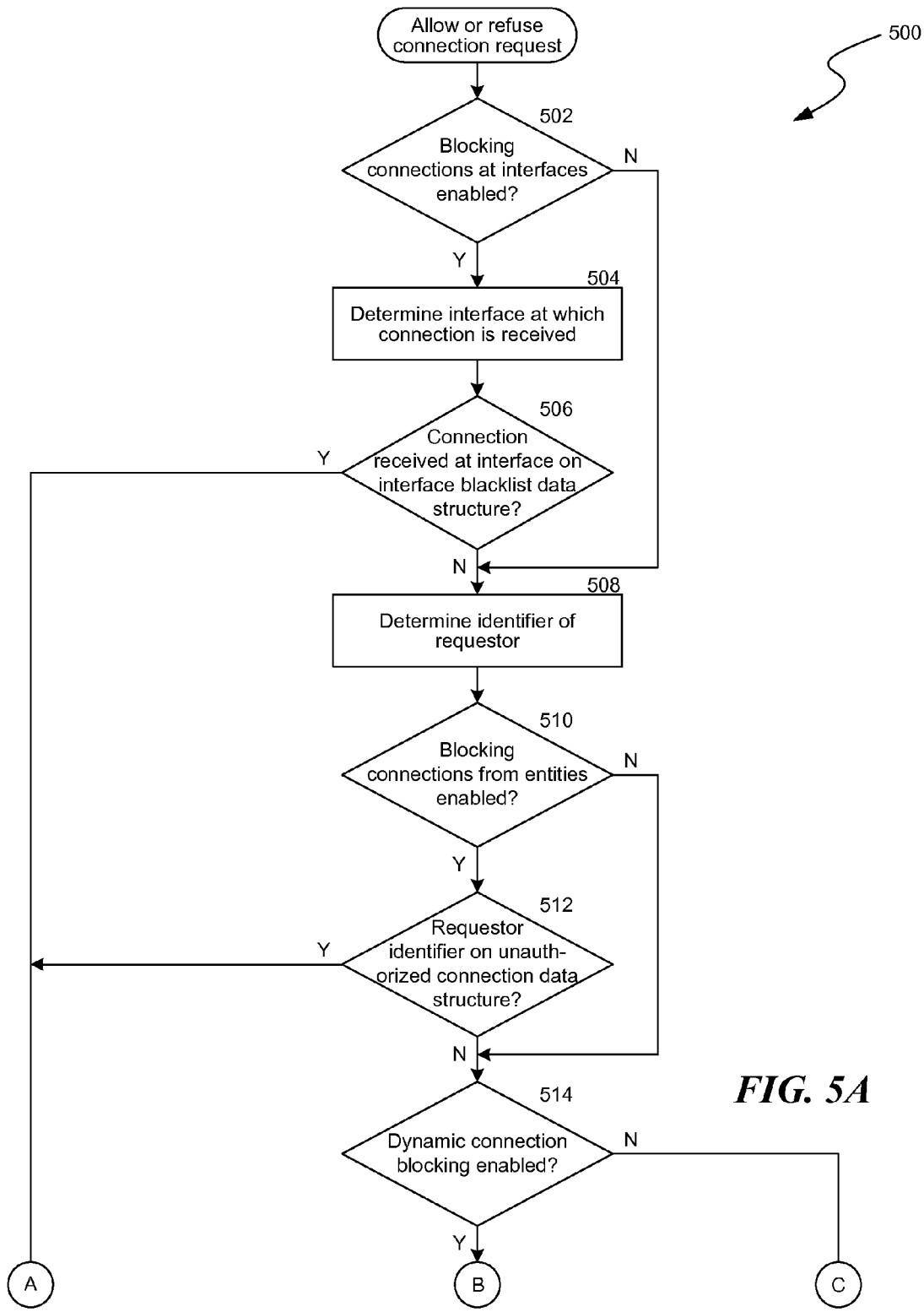
FIGS. 5A and 5B are a flow diagram of a process for allowing or refusing connection requests.
Figure 5B:
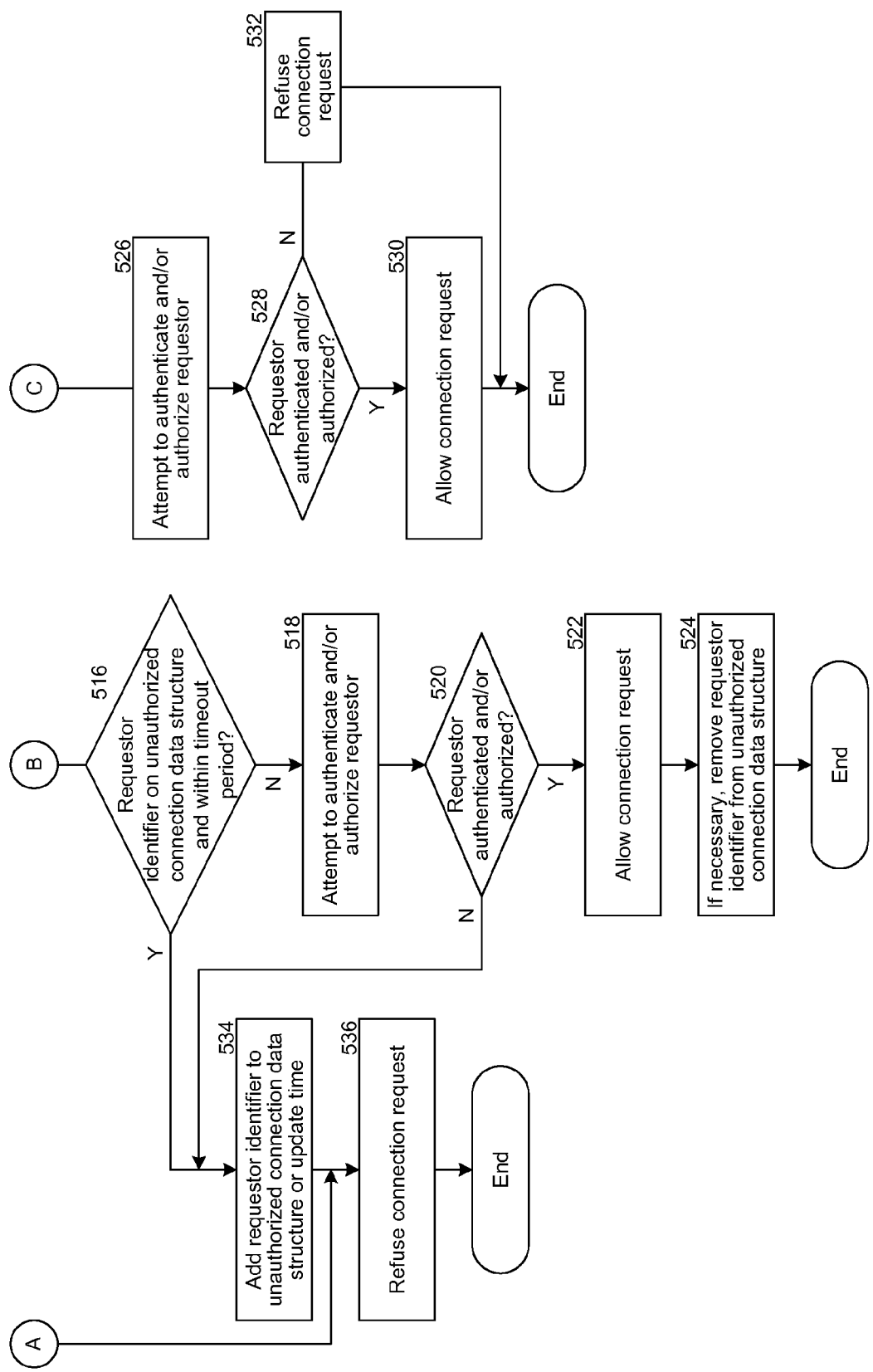

The entity may use various data structures to carry out the performance of these functions (see FIG. 3B, illustrating one such suitable data structure containing IP address that identify blacklisted computing devices). Functions performed by the entity include receiving connection requests (see FIG. 4, illustrating a process for receiving connection requests, such as connection requests for performing data storage operations). Functions performed by the entity also include allowing or refusing connection requests (see FIGS. 5A and 5B, illustrating a process for allowing or refusing connection requests, such as those received in the process of FIG. 4).

Suitable Data Storage System

FIG. 1 illustrates an example of one arrangement of resources in a computing network, comprising a data storage system 150. The resources in the data storage system 150 may employ the processes and techniques described herein. The system 150 includes a storage manager 105, one or more data agents 195, one or more secondary storage computing devices 165, one or more storage devices 115, one or more computing devices 130 (called clients 130), one or more data or information stores 160 and 162, a single instancing database 123, an index 111, a jobs agent 120, an interface agent 125, and a management agent 131. The system 150 may represent a modular storage system such as the CommVault QiNetix system, and also the CommVault GALAXY backup system, available from CommVault Systems, Inc. of Oceanport, N.J., aspects of which are further described in the commonly-assigned U.S. patent application Ser. No. 09/610,738, now U.S. Pat. No. 7,035,880, the entirety of which is incorporated by reference herein. The system 150 may also represent a modular storage system such as the CommVault Simpana system, also available from CommVault Systems, Inc.

The system 150 may generally include combinations of hardware and software components associated with performing storage operations on electronic data. Storage operations include copying, backing up, creating, storing, retrieving, and/or migrating primary storage data (e.g., data stores 160 and/or 162) and secondary storage data (which may include, for example, snapshot copies, backup copies, hierarchical storage management (HSM) copies, archive copies, and other types of copies of electronic data stored on storage devices 115). The system 150 may provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In one example, storage operations may be performed according to various storage preferences, for example, as expressed by a user preference, a storage policy, a schedule policy, and/or a retention policy. A "storage policy" is generally a data structure or other information source that includes a set of preferences and other storage criteria associated with performing a storage operation. The preferences and storage criteria may include, but are not limited to, a storage location, relationships between system components, network pathways to utilize in a storage operation, data characteristics, compression or encryption requirements, preferred system components to utilize in a storage operation, a single instancing or variable instancing policy to apply to the data, and/or other criteria relating to a storage operation. For example, a storage policy may indicate that certain data is to be stored in the storage device 115, retained for a specified period of time before being aged to another tier of secondary storage, copied to the storage device 115 using a specified number of data streams, etc.

A "schedule policy" may specify a frequency with which to perform storage operations and a window of time within which to perform them. For example, a schedule policy may specify that a storage operation is to be performed every Saturday morning from 2:00 a.m. to 4:00 a.m. In some cases, the storage policy includes information generally specified by the schedule policy. (Put another way, the storage policy includes the schedule policy.) A "retention policy" may specify how long data is to be retained at specific tiers of storage or what criteria must be met before data may be pruned or moved from one tier of storage to another tier of storage. Storage policies, schedule policies and/or retention policies may be stored in a database of the storage manager 105, to archive media as metadata for use in restore operations or other storage operations, or to other locations or components of the system 150.

The system 150 may comprise a storage operation cell that is one of multiple storage operation cells arranged in a hierarchy or other organization. Storage operation cells may be related to backup cells and provide some or all of the functionality of backup cells as described in the assignee's U.S. patent application Ser. No. 09/354,058, now U.S. Pat. No. 7,395,282, which is incorporated herein by reference in its entirety. However, storage operation cells may also perform additional types of storage operations and other types of storage management functions that are not generally offered by backup cells.

Storage operation cells may contain not only physical devices, but also may represent logical concepts, organizations, and hierarchies. For example, a first storage operation cell may be configured to perform a first type of storage operations such as HSM operations, which may include backup or other types of data migration, and may include a variety of physical components including a storage manager 105 (or management agent 131), a secondary storage computing device 165, a client 130, and other components as described herein. A second storage operation cell may contain the same or similar physical components; however, it may be configured to perform a second type of storage operations, such as storage resource management (SRM) operations, and may include monitoring a primary data copy or performing other known SRM operations.

Thus, as can be seen from the above, although the first and second storage operation cells are logically distinct entities configured to perform different management functions (i.e., HSM and SRM, respectively), each storage operation cell may contain the same or similar physical devices. Alternatively, different storage operation cells may contain some of the same physical devices and not others. For example, a storage operation cell configured to perform SRM tasks may contain a secondary storage computing device 165, client 130, or other network device connected to a primary storage volume, while a storage operation cell configured to perform HSM tasks may instead include a secondary storage computing device 165, client 130, or other network device connected to a secondary storage volume and not contain the elements or components associated with and including the primary storage volume. (The term "connected" as used herein does not necessarily require a physical connection; rather, it could refer to two devices that are operably coupled to each other, communicably coupled to each other, in communication with each other, or more generally, refer to the capability of two devices to communicate with each other.) These two storage operation cells, however, may each include a different storage manager 105 that coordinates storage operations via the same secondary storage computing devices 165 and storage devices 115. This "overlapping" configuration allows storage resources to be accessed by more than one storage manager 105, such that multiple paths exist to each storage device 115 facilitating failover, load balancing, and promoting robust data access via alternative routes.

Alternatively or additionally, the same storage manager 105 may control two or more storage operation cells (whether or not each storage operation cell has its own dedicated storage manager 105). Moreover, in certain embodiments, the extent or type of overlap may be user-defined (through a control console) or may be automatically configured to optimize data storage and/or retrieval.

Data agent 195 may be a software module or part of a software module that is generally responsible for performing storage operations on the data of the client 130 stored in data store 160/162 or other memory location. Each client 130 may have at least one data agent 195 and the system 150 can support multiple clients 130. Data agent 195 may be distributed between client 130 and storage manager 105 (and any other intermediate components), or it may be deployed from a remote location or its functions approximated by a remote process that performs some or all of the functions of data agent 195.

The overall system 150 may employ multiple data agents 195, each of which may perform storage operations on data associated with a different application. For example, different individual data agents 195 may be designed to handle Microsoft Exchange data, Lotus Notes data, Microsoft Windows 2000 file system data, Microsoft Active Directory Objects data, and other types of data known in the art. Other embodiments may employ one or more generic data agents 195 that can handle and process multiple data types rather than using the specialized data agents described above.

If a client 130 has two or more types of data, one data agent 195 may be required for each data type to perform storage operations on the data of the client 130. For example, to back up, migrate, and restore all the data on a Microsoft Exchange 2000 server, the client 130 may use one Microsoft Exchange 2000 Mailbox data agent 195 to back up the Exchange 2000 mailboxes, one Microsoft Exchange 2000 Database data agent 195 to back up the Exchange 2000 databases, one Microsoft Exchange 2000 Public Folder data agent 195 to back up the Exchange 2000 Public Folders, and one Microsoft Windows 2000 File System data agent 195 to back up the file system of the client 130. These data agents 195 would be treated as four separate data agents 195 by the system even though they reside on the same client 130.

Alternatively, the overall system 150 may use one or more generic data agents 195, each of which may be capable of handling two or more data types. For example, one generic data agent 195 may be used to back up, migrate and restore Microsoft Exchange 2000 Mailbox data and Microsoft Exchange 2000 Database data while another generic data agent 195 may handle Microsoft Exchange 2000 Public Folder data and Microsoft Windows 2000 File System data, etc.

Data agents 195 may be responsible for arranging or packing data to be copied or migrated into a certain format such as an archive file. Nonetheless, it will be understood that this represents only one example, and any suitable packing or containerization technique or transfer methodology may be used if desired. Such an archive file may include metadata, a list of files or data objects copied, the file, and data objects themselves. Moreover, any data moved by the data agents may be tracked within the system by updating indexes associated with appropriate storage managers 105 or secondary storage computing devices 165. As used herein, a file or a data object refers to any collection or grouping of bytes of data that can be viewed as one or more logical units.

Generally speaking, storage manager 105 may be a software module or other application that coordinates and controls storage operations performed by the system 150. Storage manager 105 may communicate with some or all elements of the system 150, including clients 130, data agents 195, secondary storage computing devices 165, and storage devices 115, to initiate and manage storage operations (e.g., backups, migrations, data recovery operations, etc.).

Storage manager 105 may include a jobs agent 120 that monitors the status of some or all storage operations previously performed, currently being performed, or scheduled to be performed by the system 150. (One or more storage operations are alternatively referred to herein as a "job" or "jobs.") Jobs agent 120 may be communicatively coupled to an interface agent 125 (e.g., a software module or application). Interface agent 125 may include information processing and display software, such as a graphical user interface ("GUI"), an application programming interface ("API"), or other interactive interface through which users and system processes can retrieve information about the status of storage operations. For example, in an arrangement of multiple storage operations cell, through interface agent 125, users may optionally issue instructions to various storage operation cells regarding performance of the storage operations as described and contemplated herein. For example, a user may modify a schedule concerning the number of pending snapshot copies or other types of copies scheduled as needed to suit particular needs or requirements. As another example, a user may employ the GUI to view the status of pending storage operations in some or all of the storage operation cells in a given network or to monitor the status of certain components in a particular storage operation cell (e.g., the amount of storage capacity left in a particular storage device 115).

Storage manager 105 may also include a management agent 131 that is typically implemented as a software module or application program. In general, management agent 131 provides an interface that allows various management agents 131 in other storage operation cells to communicate with one another. For example, assume a certain network configuration includes multiple storage operation cells hierarchically arranged or otherwise logically related in a WAN or LAN configuration. With this arrangement, each storage operation cell may be connected to the other through each respective interface agent 125. This allows each storage operation cell to send and receive certain pertinent information from other storage operation cells, including status information, routing information, information regarding capacity and utilization, etc. These communications paths may also be used to convey information and instructions regarding storage operations.

For example, a management agent 131 in a first storage operation cell may communicate with a management agent 131 in a second storage operation cell regarding the status of storage operations in the second storage operation cell. Another illustrative example includes the case where a management agent 131 in a first storage operation cell communicates with a management agent 131 in a second storage operation cell to control storage manager 105 (and other components) of the second storage operation cell via management agent 131 contained in storage manager 105.

Another illustrative example is the case where management agent 131 in a first storage operation cell communicates directly with and controls the components in a second storage operation cell and bypasses the storage manager 105 in the second storage operation cell. If desired, storage operation cells can also be organized hierarchically such that hierarchically superior cells control or pass information to hierarchically subordinate cells or vice versa.

Storage manager 105 may also maintain an index, a database, or other data structure 111. The data stored in database 111 may be used to indicate logical associations between components of the system, user preferences, management tasks, media containerization and data storage information or other useful data. For example, the storage manager 105 may use data from database 111 to track logical associations between secondary storage computing device 165 and storage devices 115 (or movement of data as containerized from primary to secondary storage).

Generally speaking, the secondary storage computing device 165, which may also be referred to as a media agent, may be implemented as a software module that conveys data, as directed by storage manager 105, between a client 130 and one or more storage devices 115 such as a tape library, a magnetic media storage device, an optical media storage device, or any other suitable storage device. In one embodiment, secondary storage computing device 165 may be communicatively coupled to and control a storage device 115. A secondary storage computing device 165 may be considered to be associated with a particular storage device 115 if that secondary storage computing device 165 is capable of routing and storing data to that particular storage device 115.

In operation, a secondary storage computing device 165 associated with a particular storage device 115 may instruct the storage device to use a robotic arm or other retrieval means to load or eject a certain storage media, and to subsequently archive, migrate, or restore data to or from that media. Secondary storage computing device 165 may communicate with a storage device 115 via a suitable communications path such as a SCSI or Fibre Channel communications link. In some embodiments, the storage device 115 may be communicatively coupled to the storage manager 105 via a SAN.

Each secondary storage computing device 165 may maintain an index, a database, or other data structure 161 that may store index data generated during storage operations for secondary storage (SS) as described herein, including creating a metabase (MB). For example, performing storage operations on Microsoft Exchange data may generate index data. Such index data provides a secondary storage computing device 165 or other external device with a fast and efficient mechanism for locating data stored or backed up. Thus, a secondary storage computing device index 161, or a database 111 of a storage manager 105, may store data associating a client 130 with a particular secondary storage computing device 165 or storage device 115, for example, as specified in a storage policy, while a database or other data structure in secondary storage computing device 165 may indicate where specifically the data of the client 130 is stored in storage device 115, what specific files were stored, and other information associated with storage of the data of the client 130. In some embodiments, such index data may be stored along with the data backed up in a storage device 115, with an additional copy of the index data written to index cache in a secondary storage device. Thus the data is readily available for use in storage operations and other activities without having to be first retrieved from the storage device 115.

Generally speaking, information stored in cache is typically recent information that reflects certain particulars about operations that have recently occurred. After a certain period of time, this information is sent to secondary storage and tracked. This information may need to be retrieved and uploaded back into a cache or other memory in a secondary computing device before data can be retrieved from storage device 115. In some embodiments, the cached information may include information regarding format or containerization of archives or other files stored on storage device 115.

One or more of the secondary storage computing devices 165 may also maintain one or more single instance databases 123. Single instancing (alternatively called data deduplication) generally refers to storing in secondary storage only a single instance of each data object (or data block) in a set of data (e.g., primary data). More details as to single instancing may be found in one or more of the following commonly-assigned U.S. patent applications: 1) U.S. patent application Ser. No. 11/269,512 (entitled SYSTEM AND METHOD TO SUPPORT SINGLE INSTANCE STORAGE OPERATIONS); 2) U.S. patent application Ser. No. 12/145,347 (entitled APPLICATION-AWARE AND REMOTE SINGLE INSTANCE DATA MANAGEMENT); or 3) U.S. patent application Ser. No. 12/145,342 (entitled APPLICATION-AWARE AND REMOTE SINGLE INSTANCE DATA MANAGEMENT), 4) U.S. patent application Ser. No. 11/963,623 (entitled SYSTEM AND METHOD FOR STORING REDUNDANT INFORMATION); 5) U.S. patent application Ser. No. 11/950,376 (entitled SYSTEMS AND METHODS FOR CREATING COPIES OF DATA SUCH AS ARCHIVE COPIES); or 6) U.S. patent application Ser. No. 61/100,686 (entitled SYSTEMS AND METHODS FOR MANAGING SINGLE INSTANCING DATA), each of which is incorporated by reference herein in its entirety.

In some examples, the secondary storage computing devices 165 maintain one or more variable instance databases. Variable instancing generally refers to storing in secondary storage one or more instances, but fewer than the total number of instances, of each data block (or data object) in a set of data (e.g., primary data). More details as to variable instancing may be found in the commonly-assigned U.S. patent application Ser. No. 61/164,803 (entitled STORING A VARIABLE NUMBER OF INSTANCES OF DATA OBJECTS).

In some embodiments, certain components may reside and execute on the same computer. For example, in some embodiments, a client 130 such as a data agent 195, or a storage manager 105, coordinates and directs local archiving, migration, and retrieval application functions as further described in the previously-referenced U.S. patent application Ser. No. 09/610,738. This client 130 can function independently or together with other similar clients 130.

As shown in FIG. 1, secondary storage computing devices 165 each has its own associated metabase 161. Each client 130 may also have its own associated metabase 170. However in some embodiments, each "tier" of storage, such as primary storage, secondary storage, tertiary storage, etc., may have multiple metabases or a centralized metabase, as described herein. For example, rather than a separate metabase or index associated with each client 130 in FIG. 1, the metabases on this storage tier may be centralized. Similarly, second and other tiers of storage may have either centralized or distributed metabases. Moreover, mixed architecture systems may be used if desired, that may include a first tier centralized metabase system coupled to a second tier storage system having distributed metabases and vice versa, etc.

Moreover, in operation, a storage manager 105 or other management module may keep track of certain information that allows the storage manager 105 to select, designate, or otherwise identify metabases to be searched in response to certain queries as further described herein. Movement of data between primary and secondary storage may also involve movement of associated metadata and other tracking information as further described herein.

In some examples, primary data may be organized into one or more sub-clients. A sub-client is a portion of the data of one or more clients 130, and can contain either all of the data of the clients 130 or a designated subset thereof. As depicted in FIG. 1, the data store 162 includes two sub-clients. For example, an administrator (or other user with the appropriate permissions; the term administrator is used herein for brevity) may find it preferable to separate email data from financial data using two different sub-clients having different storage preferences, retention criteria, etc.

Suitable Computing Networks

Figure 2A:
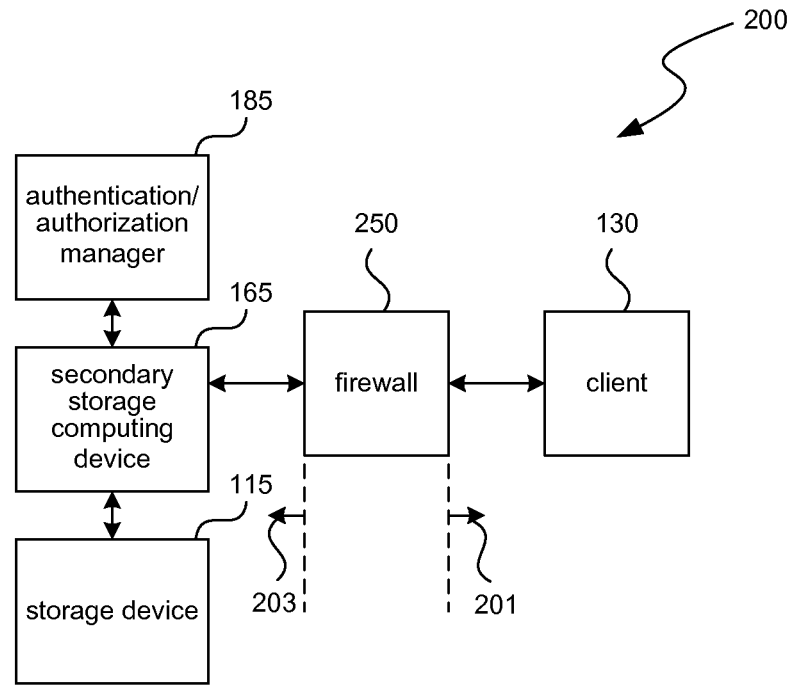
FIGS. 2A-2C are block diagrams illustrating example computing networks that may employ aspects of the invention.
Figure 2B:
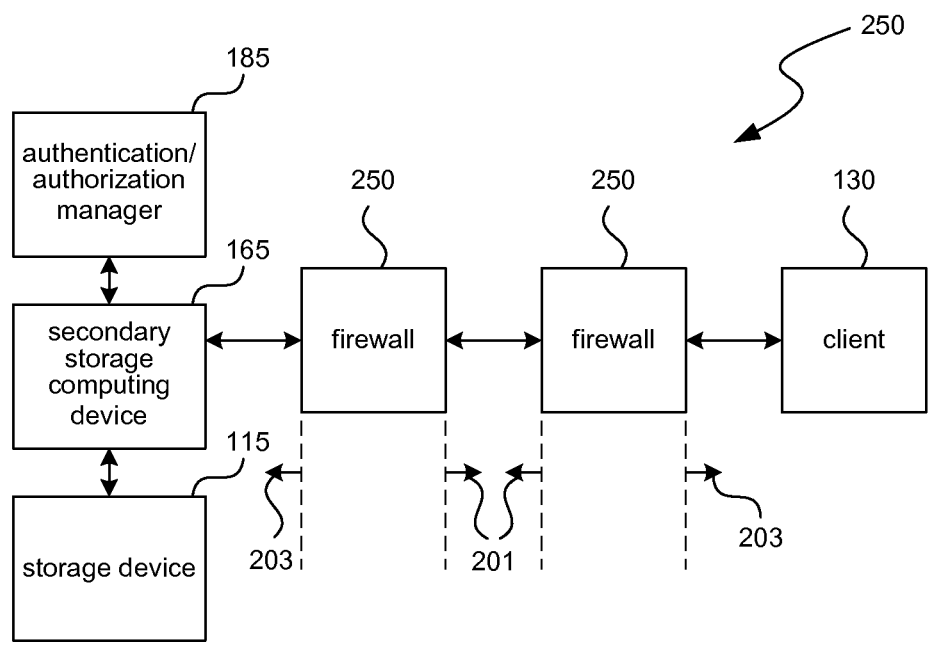
Figure 2C:
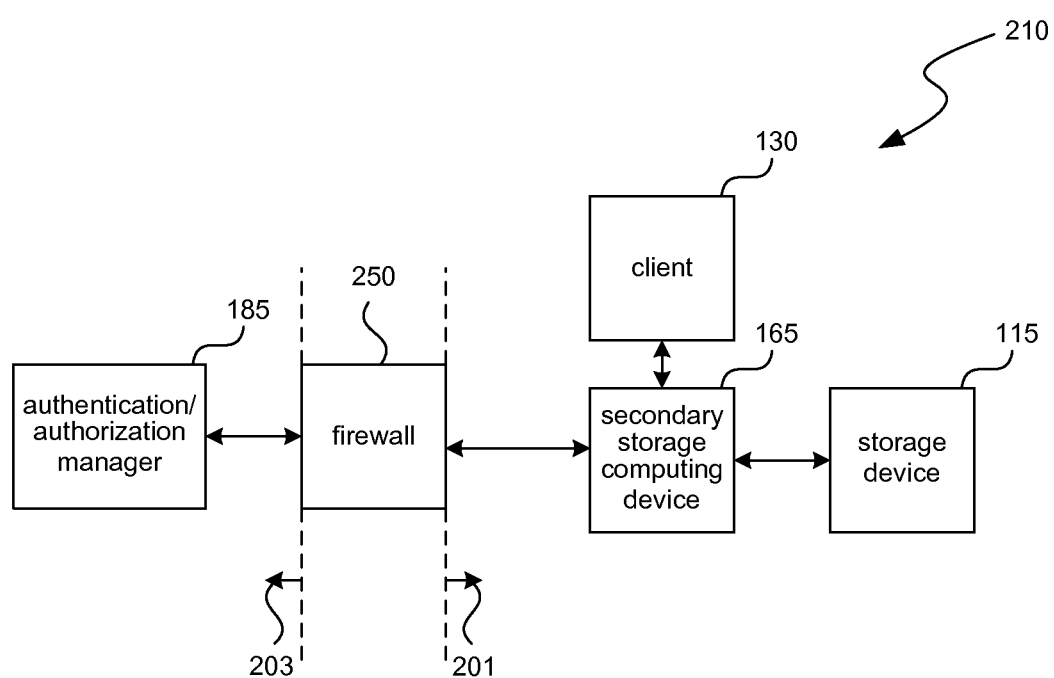

FIGS. 2A through 2C are block diagrams, each of which illustrates an example of an arrangement of resources in a computing network that may employ the systems and methods described herein. In FIG. 2A, a firewall 250 divides a computing network 200 into a friendly side 203 and a hostile side 201. The friendly side 203 may include, for example, a LAN of an organization, and the hostile side 201 may include, for example, a public network such as the Internet. An authentication/authorization manager 185, a secondary storage computing device 165, and a storage device 115 are located on the friendly side 203 of the computing network 200, and a client 130 is located on the hostile side 201 of the computing network 200.

In FIG. 2B, two firewalls 250 divide a computing network 250 into two friendly sides 203 and a hostile side 201. An authentication/authorization manager 185, a secondary storage computing device 165, and a storage device 115 are located on the first friendly side 203 and a client 130 is located on the second friendly side 203.

In FIG. 2C, a firewall 250 divides a computing network 210 into a friendly side 203 and a hostile side 201. An authentication/authorization manager 185 is on the friendly side 203 and a client 130, a secondary storage computing device 165, and a storage device 115 are located on the hostile side 201 of the computing network 210.

For example, the configurations illustrated in FIG. 2A or 2B could correspond to the situation described herein where an organization with multiple clients 130 has contracted with a vendor (with which the authentication/authorization manager 185, the secondary storage computing device 165, and the storage device 115 are associated) to perform data storage operations (such as backup operations) upon the data of the clients 130. In such a situation, the data would typically travel from the clients 130 through the firewall 250 (or the two firewalls 250 in FIG. 2B) to the secondary storage computing device 165, and ultimately to the storage device 115.

As can be seen from FIGS. 2A-2C, data storage operations may be performed entirely on a hostile side 201, entirely on a friendly side 203, or passing from a hostile side 201 through a firewall 250 to a friendly side 203, and in other fashions. Those of skill in the art will understand that resources may be arranged in computing networks other than those illustrated in FIGS. 2A-2C and therefore, that the aspects of the invention are not limited to being practiced in the computing networks described herein.

Computing Device

FIG. 3A is a block diagram illustrating a computing device 300 configured in accordance with aspects of the invention. The computing device 300 may be a specialized computing device that functions as described herein. Alternatively, the computing device 300 may be a general purpose computing device configured to function as described herein and that performs other functions. In some examples, the computing device 300 may be any of the computing devices described with reference to FIGS. 1 and 2A-2C (e.g., a storage manager 105, an authentication/authorization manager 185, a client 130, and/or a secondary storage computing device 165). The computing device 300 includes three blacklist data structures, one or more of which it uses to determine whether a connection request should be allowed or refused: an entity blacklist data structure 302, an unauthorized connection data structure 304, and an interface blacklist data structure 306.

The entity blacklist data structure 302 includes a list of identifiers that identify entities (e.g., computing devices). For example, an identifier may include an IP address of a computing device, a Media Access Control (MAC) addresses of a NIC of a computing device, a Universally Unique Identifier (UUID) of a computing device, a name of a computing device, etc. The entity blacklist data structure 302 may be static or relatively static, in that it changes infrequently and/or only upon actions of an administrator. The entities identified in the entity blacklist data structure 302 are those to which a connection request should be refused on a permanent or semi-permanent basis (at least until their identifiers are removed from the entity blacklist data structure 302).

For example, the administrator may wish to deny connections to certain clients 130, so that the clients 130 are unable to request that the associated computing device 300 perform data storage operations on their data. This may be desirable, for example, where the vendor wishes to deny the clients 130 of the contracting organization that is no longer paying for data storage operation services the ability to perform data storage operations or have data storage operations performed on their data. In some examples, the entity blacklist data structure 302 is a text file on a file system of the computing device 300 that contains a listing of IP addresses, one IP address per line in the text file, of entities to which connection requests should be refused.

The unauthorized connection data structure 304 likewise includes a list of identifiers (e.g., of the same type as those in the entity blacklist data structure 302, or of a different type) that identify entities (e.g., computing devices) in the data storage system. The unauthorized connection data structure 304 may also include a timestamp indicating a time at which the identified entity last made a connection request to the computing device 300. The computing device 300 creates the unauthorized connection data structure 304 when it commences performing data storage operations. The computing device 300 then adds the entries from the entity blacklist data structure 302 (the identifiers of entities to which connection requests should be refused) to the unauthorized connection data structure 304. As described in more detail herein, the computing device 300 may also add entries to the unauthorized connection data structure 304 for entities that the computing device 300 dynamically determines connection requests should be refused to. The dynamically determined entries in the unauthorized connection data structure 304 correspond to entities to which a connection request should be refused until a timeout period has expired (e.g., a one hour timeout period). After the timeout period has expired, the dynamic entries may be removed (or they may be voided or otherwise rendered inconsequential).

In some examples, instead of using the unauthorized connection data structure 304 (which, because it identifies entities to which connection requests may be refused, is effectively a blacklist), the computing device 300 includes another data structure that the connection manager component 308 uses to determine whether a connection request should be allowed or refused. This other data structure may include identifiers of entities to which connection requests should be allowed (a whitelist of entities). When the connection manager component 308 receives a connection request from an entity, it analyzes the other data structure to determine if the entity identifier is included on it. Only if it is does the connection manager component 308 allow the connection request from the identified entity.

In some cases, the dynamic entries in the unauthorized connection data structure 304 may be removed prior to the expiration of the timeout period, such as upon the occurrence of an event. For example, the vendor could remove a dynamic entry from the unauthorized connection data structure 304 if the contracting organization has resumed paying for data storage operations services. The vendor could similarly remove any permanent or semi-permanent entries from the unauthorized connection data structure 304.

The interface blacklist data structure 306 likewise includes a list of identifiers (e.g., of the same type as those in the persistent connection blacklist data structure 302, or of a different type) that identify interfaces (e.g., IP addresses) in the data storage system at which data storage operation connection requests are received. The interface blacklist data structure 306 may also be static or relatively static, in that it changes infrequently and/or only upon intervention of an administrator. The interfaces listed in the interface blacklist data structure 306 are those at which a connection request should be refused on a permanent or semi-permanent basis (at least until their identifiers are removed from the interface blacklist data structure 306).

For example, the computing device 300 may have two or more NICs, with at least one NIC configured to receive connections over a public network (e.g., the Internet) and at least one NIC configured to receive connections over a private network (e.g., a LAN). An administrator may wish to configure the computing device 300 to accept only connection requests that are received over the private network, and to ignore those received over the public network. The administrator can add the identifier of the public NIC interface (e.g., its IP address) to the interface blacklist data structure 306. This will cause the computing device 300 to refuse any connection requests received by the public NIC interface. In some examples, the interface blacklist data structure 306 is a text file on a file system of the computing device 300 that contains a listing of IP addresses, one IP address per line in the text file, of interfaces at which connection requests should be refused.

In some examples, instead of using the interface blacklist data structure 306, the computing device 300 uses a whitelist data structure that positively identifies only the interfaces at which connection requests should be allowed.

The computing device 300 also includes a connection manager component 308, a logging component 310, and a log data structure 312. The connection manager component 308, among other things, determines whether various data structures are present and if so, loads them into memory, enables blocking of connections at interfaces and blocking of connections from entities, determines whether dynamic connection blocking is enabled, waits for connection requests, receives connection requests, accesses various data structures to determine whether connection requests should be refused, attempts to authenticate entities requesting connections and determine if they are properly authorized, allows connections to authenticated and authorized entities, refuses connections to unauthenticated or unauthorized entities, and/or updates various data structures when it refuses connection requests. The connection manager component 308 may be logically located at the application layer (the top protocol layer in both the seven-layer OSI model and the four-layer TCP/IP model). The logging component 310 stores records of entities to which connection requests have been refused in the log data structure 312.

Suitable Data Structure

FIG. 3B is a diagram illustrating a suitable unauthorized connection data structure 304. The unauthorized connection data structure 304 includes multiple rows (e.g., rows 334, 336, 338, and 340), each of which is divided into columns in which information about an entity is stored. Column 330 stores an IP address of an entity, and column 332 stores a timestamp indicating a time at which the entity last requested a connection to the computing device 300 associated with the unauthorized connection data structure 304. For example, row 334 contains information about an entity having an IP address of "192.168.0.100" (column 330), and for which the timestamp is <null> (column 332). The <null> timestamp indicates that the information in row 334 was loaded into the unauthorized connection data structure 304 from the entity blacklist data structure 302. Accordingly, an entry with a <null> timestamp indicates that the connection requests from the corresponding entity are to be always or nearly always blocked (on a permanent or semi-permanent basis). In some examples, instead of using a <null> timestamp for those entries loaded from the entity blacklist data structure 302, the entry in the timestamp column 332 is empty, or the timestamp is that of a time well into the future (e.g., 2999-12-31 23:59:59).

As another example, row 336 contains information about an entity having an IP address of "192.105.1.108" (column 330), and for which the timestamp "2009-02-23 14:57:23." This timestamp indicates that the entity having this IP address last requested a connection to the associated computing device 300 at 14:57:23 on Feb. 23, 2009. The non-null timestamp indicates that the associated computing device 300 dynamically added the information in row 336. As another example, row 340 contains information about multiple entities for which the IP address equals "72.32.209.*" (column 330), with the "*" wildcard character indicating any number between 0 and 255. In some examples, the unauthorized connection data structure 304 allows for a further level of granularity by identifying ports, and only connections matching the combination of the IP address and the port are refused. In some examples, the unauthorized connection data structure 304 uses IPv6 IP addresses to identify entities. The unauthorized connection data structure 304 may include other columns storing other information, such as a column storing information about whether the entry is from the entity blacklist data structure 302 or the unauthorized connection data structure 304.

Process for Receiving Connection Requests

FIG. 4 is a flow diagram of a process 400 for receiving connection requests on a computing device 300. The process 400 begins at step 402 where the computing device 300 begins receiving connection requests. For example, the computing device 300 may be configured to start receiving connection requests automatically upon startup, or an administrator may manually configure the computing device 300 to start receiving connection requests. For example, a client 130 storing a set of data may attempt to connect to a secondary storage computing device 165 so that the secondary storage computing device 165 can perform a data storage operation upon the data stored on the client 130 or upon data in a storage device 115.

At step 404 the connection manager component 308 determines whether the interface blacklist data structure 306 is present (e.g., by determining whether the corresponding text file is present on the file system of the computing device 300). If so, the process 400 continues to step 406, where the connection manager component 308 loads the interface blacklist data structure 306 into memory, and to step 408, where the computing device enables blocking connections at interfaces. The process 400 then continues to step 410. If the interface blacklist data structure 306 is not present, the process 400 also continues to step 410, where the connection manager component 308 determines whether the entity blacklist data structure 402 is present (e.g., by determining whether the corresponding text file is present on the file system of the computing device 300). If so, the process 400 continues to step 412, where the connection manager component 308 adds the entries from the entity blacklist data structure 302 to the unauthorized connection data structure 304 and loads the unauthorized connection data structure 304 into memory. At step 414, the connection manager component 308 enables blocking connections from entities. The process 400 then continues to step 416.

If the entity blacklist data structure 302 is not present, the process 400 also continues at step 416, where the connection manager component 308 determines whether dynamic connection blocking is enabled. The connection manager component 308 may perform such analyzing by accessing a data structure (e.g., a registry key in a system registry) to determine if dynamic connection blocking is enabled. The process 400 then continues to step 418, where the connection manager component 308 waits for connection requests (e.g., from other entities in the data storage system, such as clients 130). At step 420 the connection manager component 308 receives a connection request (e.g., from another entity in the data storage system). At step 422, the connection manager component 308 determines whether to allow or refuse the connection request, such as by undergoing the process described with reference to FIG. 5. At step 424 the connection manager component 308 receives an indication to stop receiving connection requests. This may occur when the administrator configures the computing device 300 to stop receiving connection requests or when the computing device 300 shuts down. At step 426 the connection manager component 308 unloads the interface blacklist data structure 306 and the unauthorized connection data structure 304 from memory. At step 428 the computing device 300 stops receiving connection requests. The process 400 then concludes.

Process for Refusing or Allowing Connection Requests

FIG. 5 is a flow diagram of a process 500 implemented by the connection manager component 308 to determine whether to allow or refuse connection requests (e.g., requests to connect for purposes of performing data storage operations, or having data storage operations performed). These steps may be performed by the connection manager component 308 when it receives connection requests as described in FIG. 4 or at other times. The process 500 begins at step 502 where the connection manager component 308 determines whether blocking connections at interfaces is enabled. If so, the process 500 continues at step 504, where the connection manager component 308 determines the one or more interfaces at which the connection is received.

At step 506, the connection manager component 308 determines whether the connection was received at one or more interfaces identified on the interface blacklist data structure 306. If so, the process 500 continues at step 536, where the connection manager component 308 refuses the connection request, and the process 500 concludes. As an example of this aspect of the process 500, the computing device 300 may be a clustered computing device 300 having two or more nodes, each with its own NIC and corresponding interface. If an administrator wishes to block connections at one of the interfaces, the administrator can add the interface identifier (e.g., the IP address) to the interface blacklist data structure 306. Following that, the connection manager component 308 of the clustered computing device 300 will refuse any connection requests received at that interface.

If the connection was received at an interface that is not identified on the interface blacklist data structure 306, the process 500 continues at step 508, where the connection manager component 308 determines the identifier of the requestor of the connection. For example, if IP addresses are used as identifiers, the connection manager component 308 determines the IP address of the requestor. At step 510 the connection manager component 308 determines whether blocking connections from entities is enabled. If so, at step 512 the connection manager component 308 determines whether the requestor identifier is on the unauthorized connection data structure 304. The connection manager component 308 may do so by examining only entries on the unauthorized connection data structure 304 for which there is no timestamp (e.g., the timestamp is <null>), which indicate that connection requests from the corresponding entities are to be always or nearly always refused. If the connection manager component 308 determines that the requestor identifier is on the unauthorized connection data structure 304, the process 500 continues to step 536, where the connection manager component 308 refuses the connection request, and the process 500 concludes.

If the connection manager component 308 determines that the requestor identifier is not on the unauthorized connection data structure 304, the process 500 continues to step 514, where the connection manager component 308 determines whether dynamic connection blocking is enabled. If it is, the process continues to step 516 where the connection manager component 308 determines if the requestor identifier is on the unauthorized connection data structure 304 and if the time at which the connection request is made is within a particular time period following a time of an immediately prior connection request (e.g., within one hour of a time at which an immediately prior connection request was made). The connection manager component 308 may do so by examining only entries on the unauthorized connection data structure 304 for which there is a timestamp (e.g., the timestamp is not <null>), which indicate that the connection manager component 308 dynamically added these entries.

If the connection manager component 308 determines that the requestor identifier is either not on the unauthorized connection data structure 304 or the time at which the connection request is made is not within the particular time period, the process 500 continues to step 518, where the connection manager component 308 attempts to authenticate the requestor (e.g., to determine that the requestor is the entity that it purports to be) and/or determine whether the requestor is properly authorized (e.g., to determine whether the requestor is allowed to access resources of the computing device 300). The connection manager component 308 may attempt to do so in various ways. For example, the connection manager component 308 may request that the requestor provide it with an identifier (e.g., a name, a host name, an IP address, etc.) and a token (e.g., an encrypted password). The connection manager component 308 may then compare the provided identifier and token with a stored identifier and token in order to attempt to authenticate the requestor. If the connection manager component 308 successfully authenticates the requestor, then it may consult one or more data structures (e.g., Access Control Lists (ACLs) or other authorization data structures) to determine whether or not the requestor is properly authorized (e.g., to access resources of the computing device 300).

Additionally or alternatively, the connection manager component 308 may request that that the requestor provide it with its identifier and its token, and also request that a third party (e.g., the storage manager 105, the authentication/authorization manager 185, or another computing device that performs authentication and/or authorization) also provide it with the token corresponding to the requestor's identifier. Upon receipt, the requestor may then compare the two tokens to see if they match. If so, then the connection manager component 308 has authenticated the requestor and may then determine if the requestor is properly authorized, as described above. If they do not match, then the connection manager component 308 has not authenticated the requestor. Those of skill in the art will understand that various ways of authenticating a requestor and/or determining a requestor's authorization to access resources exist and that aspects of the invention are not limited to those described herein.

At step 520, the connection manager component 308 determines whether it has authenticated and/or authorized the requestor. If so, the process 500 continues to step 522, where the connection manager component 308 allows the requestor to connect to the computing device 300. At step 524, the connection manager component 308, if necessary, removes the requestor identifier from the unauthorized connection data structure 304 (e.g., removes the entry corresponding to the requestor from the unauthorized connection data structure, or voids or otherwise renders inconsequential the entry). The process 500 then concludes.

Returning to step 514, if the connection manager component 308 determines that dynamic connection blocking is not enabled, the process 500 continues at step 526, where the connection manager component 308 attempts to authenticate the requestor and/or determine whether the requestor is properly authorized. This authentication and/or authorization attempt may be similar to that described with respect to step 518. At step 528, if the connection manager component 308 determines that it has authenticated the requestor and/or the requestor is properly authorized, the process 500 continues to step 530, where the connection manager component 308 allows the requestor to connect to the computing device 300. If not, the process continues at step 532, where the connection manager component 308 refuses the connection request. In either case, the process 500 then concludes.

Returning to step 516, if the connection manager component 308 determines that the requestor identifier is on the unauthorized connection data structure 304 and the time at which the connection request is made is within the particular time period, the connection manager component 308 thus determines that the requestor is not authorized to connect to the computing device 300. The process 500 then continues at step 534. Similarly, at step 520, if the connection manager component 308 did not authenticate the requestor, the process 500 continues at step 534. At this step, the connection manager component 308 performs one of two actions. If the requestor identifier is already in an entry on the unauthorized connection blacklist 304 and there is a corresponding timestamp (e.g., the corresponding timestamp is not <null>), the connection manager component 308 updates the timestamp of the entry to the time of the connection request. This particular circumstance typically indicates that the immediately previous connection request made by the requestor was refused.

Alternately, if the requestor identifier is not in an entry on the unauthorized connection data structure 304, the connection manager component 308 adds an entry to the unauthorized connection blacklist 304 containing the requestor identifier and the time at which the connection request was made. The process then continues at step 536, where the connection manager component 308 refuses the connection request. The process 500 then concludes. In some examples, prior to the conclusion of the process 500, the logging component 310 stores a record of the allowance or refusal of the connection request in the log data structure 312.

As described herein, the vendor may employ the computing device 300 to perform data storage operations on data of clients 130 of several contracting organizations. If the vendor wishes to preclude one of the contracting organizations from requesting connections, the vendor administrator can add the identifiers of the contracting organization's clients 130 to the entity blacklist data structure 302 (and thus to the unauthorized connection data structure 304), and the computing device 300 will refuse connection requests from the identified clients 130.

Alternatively, the vendor can remove the accounts of the contracting organization's clients 130 from the third party managing computer (e.g., the storage manager 105, the authentication/authorization manager 185, and/or another computing device that performs authentication and/or authorization) and/or remove the authorization of the prohibited clients 130 to perform data storage operations. This will result in the prohibited clients 130 not being authenticated and/or properly authorized when they request connections to the computing device 300. The computing device 300 can then add their identifiers to the unauthorized connection data structure 304 along with a timestamp indicating the connection request time. Any connection requests from the prohibited clients 130 during a certain period of time from the connection request time would then be automatically refused by the connection manager component 308 of the computing device 300.

One advantage of adding identifiers of prohibited clients 130 to the entity blacklist data structure 302 is that the computing device 300 will forego any attempt to authenticate and/or determine authorization of identified clients 130, which conserves resources of the vendor's data storage system (e.g., the resources of the authentication/authorization manager 105). Accordingly, the vendor can devote its limited resources to the other organizations that have contracted it to perform data storage operations.

CONCLUSION

From the foregoing, it will be appreciated that specific examples of data storage systems have been described herein for purposes of illustration, but that various modifications may be made without deviating from the spirit and scope of the invention. For example, although copy operations may have been described, the system may be used to perform many types of storage operations (e.g., backup operations, restore operations, archival operations, copy operations, CDR operations, recovery operations, migration operations, HSM operations, etc.). Accordingly, the invention is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference in their entireties. Aspects of the invention can be modified, if necessary, to employ the systems, functions, and concepts of the various references described above to provide yet further implementations of the invention.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in implementation details, while still being encompassed by the invention disclosed herein. For example, while the computing networks described in FIGS. 2A-2C contemplate use of a firewall, the methods and systems described herein may be employed in computing networks that do not include a firewall. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. As another example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the inventors reserve the right to add additional claims after filing the application to pursue such additional claim forms for other aspects of the invention.

We claim:

1. A system for managing connections in a data storage system, wherein the data storage system includes at least one client computing device storing data, the system comprising:
   an authentication manager;
   a storage device; and
   at least one secondary storage computing device configured to receive a request from the client computing device to store the data on the storage device, wherein the secondary storage computing device includes:
      a blacklist that includes one or more entries, wherein the entries include an identifier of a computing device;
      a connection manager component configured to:
         receive, at a first time, from the client computing device a connection request, wherein the connection request includes a identifier identifying the client computing device;
         based upon the identifier of the client computing device or the combination of the identifier of the client computing device and the first time, determine from the blacklist whether the connection request from the client computing device should be refused;
         refuse the connection request from the client computing device if the connection request from the client computing device should be refused based upon the determination from the blacklist;
         if the connection request from the client computing device should not be refused based upon the determination from the blacklist, then determine whether the client computing device is authenticated or authorized to connect to the secondary storage computing device;
         if the client computing device is either not authenticated or not authorized to connect to the secondary storage computing device, refuse the connection request from the client computing device; and
         if the client computing device is authenticated, or if the client computing device is authorized to connect to the secondary storage computing device, allow the client computing device to connect to the secondary storage computing device,
      wherein the secondary storage computing device is located at a friendly side of a firewall, wherein the client computing device is not located at the friendly side of the firewall, and wherein the secondary storage computing device receives the request from the client computing device through the firewall.

2. The system of claim 1 wherein the entries of the blacklist further include a timestamp indicating a time at which the secondary storage computing device received a connection request from the identified computing device.

3. The system of claim 1 wherein the connection manager component is further configured to either:
   add an entry to the blacklist that includes the identifier of the client computing device and a timestamp indicating the first time; or
   modify a timestamp of an existing entry of the blacklist that includes the identifier of the client computing device to indicate the first time.

4. The system of claim 1 wherein the secondary storage computing device further includes:
   an interface at which the secondary storage computing device receives the connection request; and
   an interface blacklist, wherein the interface blacklist includes one or more entries, wherein at least one of the entries is configured to include an identifier of an interface,
   wherein the connection manager component is further configured to:
      determine an identifier of the interface;
      based upon the identifier of the interface, determine from the interface blacklist whether the connection request from the client computing device should be refused; and
      refuse the connection request from the client computing device if the connection request from the client computing device should be refused based upon the determination from the interface blacklist.

5. The system of claim 1 wherein the connection manager component is further configured to remove an existing entry that includes the identifier of the client computing device from the blacklist if the client computing device is authorized.

6. The system of claim 1 wherein the connection manager component is further configured to:
   receive an identifier of a computing device to which the connection manager component should refuse connection requests; and
   add the identifier of the computing device to the blacklist.

7. The system of claim 1 wherein the connection manager component is further configured to receive an indication to enable refusing connection requests from computing devices that are not authorized.

8. The system of claim 1 wherein the blacklist includes at least two entries, wherein a first entry includes an identifier of a computing device, and wherein a second entry includes an identifier of another computing device and a timestamp indicating a time at which the connection manager component received a connection request from the identified other computing device.

9. The system of claim 1 wherein the data storage system includes at least two different hierarchical tiers of data storage, wherein the client computing device is at a first hierarchical tier of data storage, and wherein the secondary storage computing device is at a second hierarchical tier of data storage.

10. The system of claim 1, wherein the authentication manager performs both authentication of the client computing device and determining whether the client computing device is authorized to access the secondary storage computing device.

11. A method of managing connections in a data storage system, wherein the data storage system includes at least two computing devices, the method comprising:
- receiving, at a local computing device, a connection request from a remote computing device,
  - wherein the connection request includes an identifier that identifies the remote computing device,
  - wherein the local computing device is located at a friendly side of a firewall, and
- accessing a blacklist, wherein the blacklist includes one or more entries, wherein the entries include an identifier of a computing device;
- receiving an indication to enable refusing connection requests at the local computing device to computing devices that are not at the friendly side of the firewall;
- based upon the identifier of the remote computing device, determining from the blacklist whether the connection request from the remote computing device should be refused; and,
- if the connection request from the remote computing device should be refused based upon the determination from the blacklist, then refusing the connection request from the remote computing device;
- if the remote computing device is either not authenticated or not authorized to connect to the local computing device, refusing the connection request from the remote computing device; and
- if the remote computing device is authenticated, or if the remote computing device is authorized to connect to the local computing device, allowing the remote computing device to connect to the local computing device.

12. The method of claim 11, further comprising, if the connection request from the remote computing device is refused, then either:
- adding an entry to the blacklist that includes the identifier of the remote computing device and a timestamp indicating the first time; or
- modifying a timestamp of an existing entry of the blacklist that includes the identifier of the remote computing device to indicate the first time.

13. The method of claim 11 wherein the local computing device receives the connection request at an interface, and further comprising:
- determining an identifier of the interface at which the connection request is received;
- accessing an interface blacklist data structure, wherein the interface blacklist data structure includes one or more entries, wherein at least one of the entries is configured to store an identifier of an interface;
- based upon the identifier of the interface, determining from the interface blacklist data structure whether the connection request from the remote computing device should be refused; and
- if the connection request from the remote computing device should be refused based upon the determination from the interface blacklist data structure, then refusing the connection request from the remote computing device.

14. The method of claim 11 further comprising:
- requesting that an authorization computing device determine whether the remote computing device is authorized to connect to the local computing device; and
- receiving an indication from the authorization computing device whether the remote computing device is authorized to connect to the local computing device,
- wherein, if the remote computing device is authorized to connect to the local computing device, then removing an existing entry from the blacklist that includes the identifier of the remote computing device.

15. The method of claim 11, further comprising:
- receiving an identifier of a computing device to which the local computing device should refuse connection requests; and
- adding the identifier of the computing device to the blacklist.

16. The method of claim 11, wherein the entries of the blacklist further include a timestamp indicating a time at which the secondary storage computing device received a connection request from the identified computing device.

17. The method of claim 11 wherein the blacklist includes at least two entries, wherein a first entry includes only an identifier of a computing device, and wherein a second entry includes an identifier of another computing device and a timestamp indicating a time at which the local computing device received a connection request from the identified other computing device.

18. The method of claim 11 wherein at least one of the entries included in the blacklist includes an identifier of a computing device that is not licensed in the data storage system.

19. A computer-readable, non-transitory medium including instructions for managing connections in a data storage system, comprising:
- receiving, at a first time at a first computing device, a connection request from a second computing device,
  - wherein the connection request includes an identifier that identifies the second computing device;
- accessing a blacklist,
  - wherein the blacklist includes zero or more entries, and,
  - wherein the entries are configured to include an identifier of a computing device;
- receiving an indication to enable refusing connection requests at the first computing device to computing devices that are not on a friendly side of a firewall and that are not authenticated;
- based upon the combination of the identifier of the second computing device and the first time, determining from the blacklist whether the connection request should be refused; and,
  - if the connection request from the second computing device should be refused based upon the determination from the blacklist, then refusing the connection request from the second computing device;
  - if the second computing device is either not authenticated or not authorized to connect to the secondary storage computing device, refuse the connection request; and
  - if the second computing device is authenticated, or if the second computing device is authorized to connect to the first computing device, allowing the second computing device to connect to the first storage computing device.

20. The computer-readable medium of claim 19 further comprising, if the connection request from the second computing device is refused, then either:
- adding an entry to the blacklist that includes the identifier of the second computing device and a timestamp indicating the first time; or
- modifying a timestamp of an existing entry of the blacklist that includes the identifier of the second computing device to indicate the first time.

* * * * *